United States Patent [19]
Binkley et al.

[11] Patent Number: 5,277,848
[45] Date of Patent: Jan. 11, 1994

[54] METHOD AND APPARATUS FOR DOWNCOMER TRAY OPERATION

[75] Inventors: Michael J. Binkley, Glenn Heights; John T. Thorngren, Dallas, both of Tex.

[73] Assignee: Glitsch, Inc., Dallas, Tex.

[21] Appl. No.: 930,080

[22] Filed: Aug. 14, 1992

Related U.S. Application Data

[63] Continuation of Ser. No. 577,355, Sep. 4, 1990, Pat. No. 5,164,125.

[51] Int. Cl.$^5$ ................................. B01F 3/04
[52] U.S. Cl. ................................. 261/114.1
[58] Field of Search ................................. 261/114.1

[56] References Cited

U.S. PATENT DOCUMENTS

| | | | |
|---|---|---|---|
| 2,222,565 | 11/1940 | Kraft | 261/114.1 |
| 2,558,222 | 6/1951 | Parkinson | 261/114.1 |
| 2,582,826 | 1/1952 | Glitsch | 189/34 |
| 2,611,596 | 9/1952 | Glitsch | 261/114 |
| 2,840,182 | 6/1958 | Coulter et al. | 261/114.1 |
| 3,008,553 | 11/1961 | Glitsch et al. | 189/36 |
| 3,013,782 | 12/1961 | Glitsch | 261/114 |
| 3,079,134 | 3/1961 | Winn | 261/113 |
| 3,080,155 | 3/1963 | Glitsch et al. | 261/114 |
| 3,087,711 | 4/1963 | Glitsch | 261/114 |
| 3,233,708 | 2/1966 | Glitsch | 189/36 |
| 3,343,821 | 9/1967 | Winn et al. | 261/112 |
| 3,410,540 | 11/1963 | Bruckert | 261/113 |
| 3,747,905 | 7/1973 | Nutter | 261/114.1 |
| 3,862,281 | 1/1975 | Uchiyama | 261/114.4 |
| 3,958,964 | 5/1976 | Koch | 261/114.1 |
| 3,959,419 | 5/1976 | Kitterman | 261/98 |
| 3,969,447 | 7/1976 | Glitsch, et al. | 261/111 |
| 4,123,008 | 10/1978 | McClain | 239/568 |
| 4,132,604 | 1/1979 | Alexion et al. | 261/114.1 |
| 4,159,291 | 6/1979 | Bruckert et al. | 261/114.1 |
| 4,198,002 | 4/1980 | McClain | 239/568 |
| 4,499,035 | 2/1985 | Kirkpatrick et al. | 261/114 JP |
| 4,504,426 | 3/1985 | Chuang et al. | 261/114 R |
| 4,543,219 | 9/1985 | Yamato et al. | 261/109 |
| 4,550,000 | 10/1985 | Bentham | 261/114.1 |
| 4,597,916 | 7/1986 | Chen | 261/94 |
| 4,603,022 | 7/1986 | Yoneda et al. | 261/114 R |
| 4,604,247 | 8/1986 | Chen et al. | 261/94 |
| 4,729,857 | 3/1988 | Lee et al. | 261/97 |
| 4,842,778 | 6/1989 | Chen et al. | 261/97 |
| 4,869,851 | 9/1989 | Parker et al. | 261/114.1 |
| 4,909,967 | 3/1990 | Binkley et al. | 261/97 |
| 4,950,430 | 8/1990 | Chen et al. | 261/112.2 |
| 4,956,127 | 9/1990 | Binkley et al. | 261/114.1 |
| 5,047,179 | 9/1991 | Nye | 261/114.1 |
| 5,049,319 | 9/1991 | Nye | 261/114.1 |
| 5,080,837 | 1/1992 | Gyokhegyi et al. | 261/114.1 |
| 5,106,556 | 4/1992 | Binkley et al. | 261/114.1 |

FOREIGN PATENT DOCUMENTS

| | | | |
|---|---|---|---|
| 627942 | 10/1932 | Fed. Rep. of Germany | 261/114.1 |
| 823108 | 11/1959 | United Kingdom | 261/114.1 |
| 1416731 | 12/1975 | United Kingdom | 261/114.1 |

OTHER PUBLICATIONS

Glitsch, Inc., "Balast Tray Design Manual," Bulletin No. 4900–Fifth Edition.
Gilbert Chen, "Packed Column Internals" *Chemical Engineering*, Mar. 5, 1984 (reprint).

*Primary Examiner*—Tim Miles
*Attorney, Agent, or Firm*—Johnson & Gibbs

[57] ABSTRACT

A downcomer tray assembly for vapor liquid contact towers. The region of the tray beneath an upper downcomer is constructed with a raised, perforated region for facilitating vapor passage therethrough and improving mass transfer efficiency. The downcomer includes a series of grouped discharge orifices disposed above either the perforated inlet or, in some cages, covered inlet areas which comprise momentum barriers. The covered areas in conjunction with the grouped orifices break the momentum of the liquid impacting upon the inlet area to reduce weeping. The vapor rising through the open inlet area sections is also selectively directed into the liquid discharged from the grouped downcomer orifices to promote uniform aeration of the liquid. A splash deflector is disposed outwardly of the raised inlet area to reduce any liquid maldistribution flowing from the inlet area and to deflect liquid splashed outwardly therefrom.

9 Claims, 3 Drawing Sheets

METHOD AND APPARATUS FOR DOWNCOMER TRAY OPERATION

BACKGROUND OF THE INVENTION

This is a continuation of U.S. patent application Ser. No. 07/577,355, filed Sept. 4, 1990, now U.S. Pat. No. 5,164,125.

FIELD OF THE INVENTION

The present invention pertains to gas-liquid contacting trays and, more particularly, an improved downcomer-tray assembly incorporating a grouped orifice downcomer and tray construction for higher efficiency operation.

HISTORY OF THE PRIOR ART

Distillation columns are utilized to separate selected components from a multicomponent stream. Generally, such gas-liquid contact columns utilize either trays, packing or combinations thereof. In recent years the trend has been to replace the so-called "bubble caps", by sieve and valve trays in most tray column designs, and the popularity of packed columns, either random (dumped) or structured packing have been utilized in combination with the trays in order to effect improved separation of the components in the stream.

Successful fractionation in the column is dependent upon intimate contact between liquid and vapor phases. Some vapor and liquid contact devices, such as trays, are characterized by relatively high pressure drop and relatively high liquid hold-up. Another type of vapor and liquid contact apparatus, namely structured high efficiency packing, has also become popular for certain applications. Such packing is energy efficient because it has low pressure drop and low liquid hold-up. However, these very properties at times make columns equipped with structured packing difficult to operate in a stable, consistent manner. Moreover, many applications simply require the use of trays.

Fractionation column trays come in two configurations: cross-flow and counter flow. The trays generally consist of a solid tray or deck having a plurality of apertures and are installed on support rings within the tower. In cross-flow trays, vapor ascends through the apertures and contacts the liquid moving across the tray, through the "active" area thereof. In this area, liquid and vapor mix and fractionation occurs. The liquid is directed onto the tray by means of a vertical channel from the tray above. This channel is referred to as the Inlet Downcomer. The liquid moves across the tray and exits through a similar channel referred to as the Exit Downcomer. The location of the downcomers determines the flow pattern of the liquid. If there are two Inlet Downcomers and the liquid is split into two streams over each tray, it is called a two pass tray. If there is only one Inlet and one outlet Downcomer on opposite sides of the tray, it is called a single pass tray. For two or more passes, the tray is often referred to as a Multipass Tray. The number of passes generally increases as the required (design) liquid rate increases.

Not all areas of a tray are active for vapor-liquid contact. For example, the area under the Inlet Downcomer is generally a solid region. To attempt to gain more area of the tray for vapor/liquid contact, the downcomers are often sloped. The maximum vapor/liquid handling capacity of the tray generally increases with an increase in the active or Bubbling Area. There is, however, a limit as to how far one can slope the downcomer(s) in order to increase the Bubbling Area otherwise the channel will become too small. This can restrict the flow of the liquid and/or restrict the disengagement of vapor retained in the liquid, cause liquid to back up in the downcomer, and thus prematurely limit the normal maximum vapor/liquid handling capacity of the tray. The present invention specifically addresses the problem of restricted disengagement of vapor retained in the liquid.

A variation for increasing the Bubbling Area and hence vapor/liquid handling capacity is a Multiple Downcomer (MD) tray. There is usually a plurality of box shaped vertical channels installed in a symmetrical pattern across the tray to direct liquid onto and off of the tray. The downcomers do not extend all the way to the tray below but stop short of the tray by a predetermined distance which is limited by a sufficient space to permit disengagement of any vapor retained in the liquid entering the Exit Downcomer. The downcomer pattern is rotated 90 degrees between successive trays. The bottom of the boxes is solid except for slots that direct the liquid onto the Bubbling Area of the tray below, in between the outlet downcomers of the tray. The MD tray falls into the category of Multipass Trays and is usually used for high liquid rates.

Addressing now select cross flow plate designs, a particularly effective tray in process columns is the sieve tray. This tray is constructed with a large number of apertures formed in the bottom surface. The apertures permit the ascending vapor to flow into direct engagement with the liquid that is flowing across the tray from the downcomer described above. When there is sufficient vapor flow upwardly through the tray, the liquid is prevented from running downwardly through the apertures (referred to as "weeping"). A small degree of weeping is normal in trays while a larger degree of weeping is detrimental to the capacity and efficiency of a tray.

The capacity of a tray is a function of the open area of holes and of tray spacing. When spacing is fixed, capacity may be increased by increasing the percent open area. This practice is limited, however, by decreased turndown due to weeping at low vapor rates. To overcome such weeping, a tray has been developed which is constructed from closely spaced rods of trapezoidal cross-section. They are manufactured and sold by the assignee of the present invention under the trademark SCREEN TRAY.

The trapezoidal wire members of the SCREEN TRAY are tapered upwardly, and this creates a Venturi effect to ascending vapor. Surface tension effects become pronounced with such close wire spacing. Combined with the Venturi effect produced by vapor rising through the tapered throats between the wires, surface tension phenomena reduce weeping significantly at low liquid rates and keep spray height low. The upward taper also defines a larger surface area for liquid flowing across the tray. For additional discussions of SCREEN TRAYS and another invention related thereto which improve gas-liquid contact, reference is made to copending, U.S. patent application Ser. No. 07/304,942 (now abandoned) filed on Jan. 31, 1989 and assigned to the assignee of the present invention.

Tray efficiency is also known to be improved in sieve type trays by increasing the froth height of the liquid and reducing the backflow of the liquid flowing across the tray. Froth is created when vapor bubbles percolate upwardly through the liquid flowing across the tray. The suspension of the vapor in the liquid prolongs the vapor liquid contact which enhances the efficiency of the process. The longer the froth is maintained and the higher the froth is established, the greater the vapor liquid retention. Higher froth requires smaller vapor bubbles and the formation of the bubbles at a sufficiently slow rate. Likewise, backflow occurs beneath the froth when circulating currents of liquid are established during the liquid flow across the plate. This generally forms along the lateral portions thereof. These currents carry liquid back across the tray in a manner that reduces the concentration-difference driving force for mass transfer. It is the concentration-difference between the vapor and the liquid which enhances the effectiveness of the vapor-liquid contact.

The concentration-difference between the vapor and the liquid can be effected in many ways; some reducing efficiency. For example, as operating pressure increases, descending liquid begins to absorb vapor an it moves across a tray. This is above that normally associated as dissolved gas as governed by Henry's Law and represents much larger amounts of vapor bubbles that are commingled or "entrained" with the liquid. This vapor is not firmly held and is released within the downcomer, and, in fact, the majority of said vapor must be released otherwise the downcomer can not accommodate the liquid/vapor mixture and will flood, thus preventing successful tower operation. This phenomena is generally deemed to occur when operating pressure is such as to produce a vapor density above about 1.0 lbs/cu. ft. and typically amounts to about 10 to 20% of the vapor by volume. For conventional trays, as shown below, the released vapor must oppose the descending frothy vapor/liquid mixture flowing over the weir into the downcomer. In many cases, such opposition leads to poor tower operation and premature flooding.

Another serious problem which manifests itself in such operational applications is maldistribution of flow. If the tray design in such that liquid flow volumes can build up in particular areas such as the center of a tray the liquid buildups can be passed from tray to tray, resulting in reduced efficiency and localized flowing. It is thus a major design consideration to regulate liquid flow from the downcomer as well as across the active tray area.

The technology of gas-liquid contact addresses many performance issues. Certain performance and design issues are seen in the publication "Ballast Tray Design Manual", Bulletin No. 4900—Fifth Edition, by Glitsch, Inc., assignee of the present invention. Other examples are seen in several prior art patents, which include U.S. Pat. No. 3,959,419, 4,604,247 and 4,597,916, each assigned to the assignee of the present invention and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating vapor ascension therethrough.

U.S. Pat. No. 4,550,000 assigned to Shell Oil Company teaches apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings secured to the tray deck beneath the downcomers for breaking up the descending liquid flow. Such advances improve tray efficiency within the confines of prior art structures. Likewise, U.S. Pat. No. 4,543,219 assigned to Nippon Kayaku Kabushiki Kaisha of Tokyo, Japan teaches a baffle tray tower. The operational parameters of high gas-liquid contact efficiency and the need for low pressure lose are set forth. Such references are useful in illustrating the need for high efficiency vapor liquid contact in tray process towers. U.S. Pat. No. 4,504,426 issued to Karl T. Chuang et. al. and assigned to Atomic Energy of Canada Limited is yet another example of gas-liquid contacting apparatus. This reference likewise teaches the multitude of advantages in improving efficiency in fractionation and modifications in downcomer-tray designs. The perforated area of the tray is extended beneath the downcomer with between 0 to 25% less perforation area.

Yet another reference is seen in U.S. Pat No. 3,410,540 issued to W. Bruckert in 1968. A downcomer outlet baffle is therein shown to control the discharge of liquid therefrom. The baffle may include either a static seal or dynamic seal. In this regard the openings from the downcomer are sufficiently small to control discharge and may be larger than the tray perforations and of circular or rectangular shape. The transient forces which may disrupt the operation of a downcomer are also more fully elaborated therein. These forces and related vapor-liquid flow problems must be considered for each application in which a downcomer feeds an underlying tray. The location of the downcomer discharge orifice is one of the issues addressed by the present invention.

It would be an advantage to provide a method of and apparatus for enhanced downcomer-tray vapor flow manifesting increased efficiency. Such a downcomer-tray assembly is provided by the present invention wherein a slash deflector is disposed outwardly of the downcomer, which downcomer area may include a uniformly raised, active inlet area panel secured thereneath. The downcomer is constructed with grouped discharge orifices for select discharge upon the inlet area. The inlet area panel has a plurality of vapor discharge apertures, some of which are covered by momentum barriers, disposed beneath the grouped discharge orifices of the downcomer. The momentum barriers may also be replaced with an active area having non-perforated regions. Such designs prevent the liquid from being driven through the apertures of the raised panel inlet area, particularly when there are low vapor flow rates. The momentum of the falling liquid from the downcomer is thus selectively controlled to promote uniform aeration of the liquid, reduce flow maldistributions and reduce weeping of liquid through the tray.

SUMMARY OF THE INVENTION

The present invention relates to gas-liquid contacting trays and improvements in the downcomer-tray assembly. More particularly, one aspect of the invention includes an improved method of mixing vapor with liquid discharge from a downcomer of a process column onto an underlying cross flow tray wherein the improvement comprises forming the downcomer with a discharge region having discharge orifices in a size and spacing above a raised active inlet area of the tray for select discharge thereupon in area flow amounts commensurate with the size of the raised active inlet area disposed beneath the downcomer.

In another aspect, the invention includes an improved method of mixing vapor with liquid discharged from a downcomer wherein the improvement comprises constructing a cross flow tray with a uniformly raised, active inlet area having vapor flow openings therein disposed beneath a discharge area of the downcomer and forming the downcomer with discharge orifices in the discharge area of a select size and spacing. The discharge orifices of the discharge area are disposed across the downcomer in an array effecting variable discharge volume and streams therefrom onto the underlying active inlet area of the tray. Vapor is then vectored from the uniformly raised active inlet area into engagement with the selectively discharged liquid streams and outwardly from the inlet area and the downcomer onto the tray for cross flow therefrom. This step promotes uniform aeration of the liquid and reduces weeping through the inlet area. The step of constructing the tray may also include positioning the uniformly raised active inlet area in an intermediate section of the tray to comprise a multiple downcomer configuration with the same advantages. The improved uniformity of aerated liquid above the active inlet areas should thus tend to cushion the momentum of liquid discharged thereon from the grouped discharge orifices.

In one aspect of the invention, the above described methods further include the step of providing a plurality of blanking strips and positioning the strips beneath the grouped orifices of the downcomer and above the inlet area for providing momentum barriers to the liquid discharge therefrom. The strips break the momentum of the liquid and reduces the passage of the liquid through the raised active inlet area. The blanking strips may be of substantially the same size and shape as the downcomer discharge orifices. In one embodiment of the invention, the blanking strips may be replaced with an inlet area having non-perforated regions in place thereof.

In another aspect of the invention, the method described above further includes the steps of providing a deflector shield outwardly of the raised active inlet area and deflecting liquid splashing from the surface of the raised active inlet area. This step prevents the liquid from being deflected over active areas of the tray which would reduce efficiency. The splash deflector may also be constructed with a plurality of apertures therein for facilitating the flow of vapor therethrough while partially blocking the flow of liquid to reduce any maldistribution of flow from the downcomer area. The step of forming the discharge orifices includes the step of installing relatively smaller discharge orifices near the opposite ends of the downcomer for discharging less liquid from the end regions disposed adjacent the side walls of the process column. This step improves the flow distribution and flow patterns across the tray. The discharge orifices may also be provided in groups of orifices, such as small holes in select patterns or larger slots with select spacing for discharging select volumes of liquid therefrom.

In yet a further aspect, the invention includes an improved downcomer tray assembly for a process column comprising a substantially uniformly raised active inlet area disposed beneath a first downcomer for establishing preferential vapor flow beneath the downcomer and injecting vapor into the engagement with liquid therefrom. Means are specifically provided for discharging liquid from the downcomer in select quantities and select locations relative to the raised active inlet area disposed therebeneath. The discharge means comprises discrete arrays of apertures formed within a plate disposed in the downcomer, the apertures being sized and spaced in the discharge plate for discharging select quantities of liquid therefrom from select locations therealong to promote uniform aeration of the liquid. The apertures are grouped into select arrays for the discharge of select liquid volumes, which arrays may include holes, slots or other openings, a plurality of momentum breaking strips may also be disposed between the downcomer discharge means and the raised active inlet area for shielding the raised active inlet area from the momentum of the liquid discharge from the downcomer. A deflector shield may also be disposed outwardly of the downcomer to reduce the effects of splashing and to reduce maldistribution problems in the flow.

BRIEF DESCRIPTION OF THE DRAWINGS

For a more complete understanding of the present invention and for further objects and advantages thereof, reference may now, be had to the following description taken in conjunction with the accompanying drawings in which.

DETAILED DESCRIPTION OF THE PREFERRED EMBODIMENT

Figure 1:
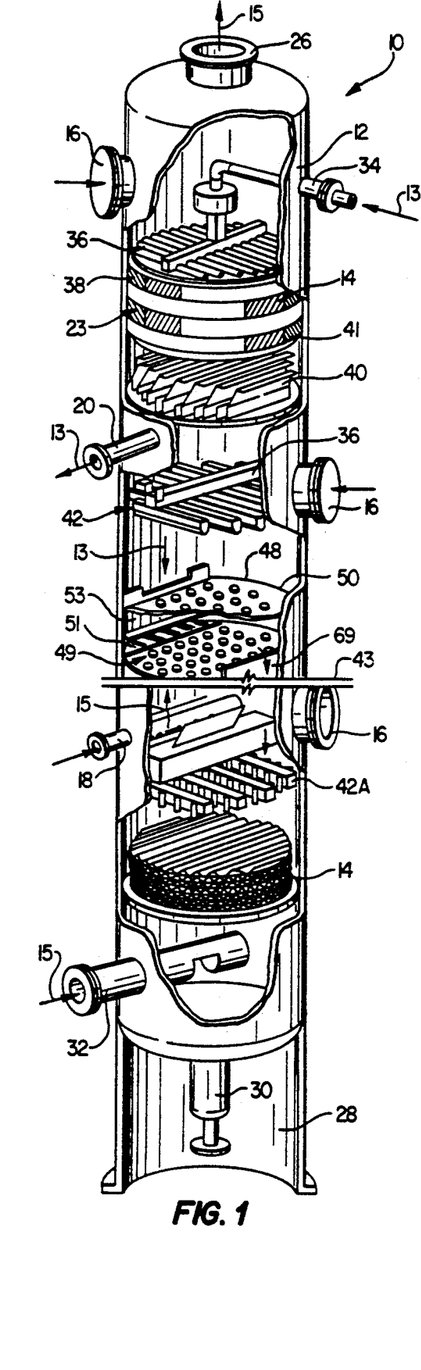
FIG. 1 is a perspective view of a packed column with various sections cut away for illustrating, diagrammatically, a variety of tower internals and one embodiment of a downcomer-tray assembly constructed in accordance with the principles of the present invention disposed therein.

Referring first to FIG. 1, there is shown a fragmentary, perspective view of an illustrative packed exchange tower or column with various sections cut away for showing a variety of tower internals and the utilization of one embodiment of the improved high capacity tray assembly of the present invention. The exchange column 10 of FIG. 1 comprises a cylindrical tower 12 having a plurality of packing bed layers 14 and trays disposed therein. A plurality of manways 16 are likewise constructed for facilitating access to the internal region of the tower 12. Also provided are side stream draw off line 20, liquid side feed line 18, and side stream vapor feed line or reboiler return line 32. A reflux return line 34 is provided atop the tower 10.

In operation, liquid 13 is fed into the tower 10 through reflux return line 34 and side stream feed input feed line 18. The liquid 13 flows downwardly through the tower and ultimately leaves the tower either at side stream draw off 20, or at bottom stream draw off line 30. In its downward flow, the liquid 13 is depleted of some material which evaporates from it as it passes through the trays and packing beds, and is enriched or added to by material which condenses into it out of the vapor stream.

Still referring to FIG. 1, the exchange column 10 is diagrammatically cut in half for purposes of clarity. In this illustration, the column 10 includes a vapor outlet in overhead line 26 disposed atop the tower 12 and a lower skirt 28 disposed in the lower region of the tower around bottom stream takeoff line 30 coupled to a reboiler (not shown). Reboiler return conduit 32 is shown disposed above the skirt 28 for recycling vapor therein upwardly through the trays and/or packing layers 14. Reflux from condensers is provided in the upper tower region 23 through entry conduit 34 wherein reflux is distributed throughout a liquid distributor 36 across upper packing bed 38. It may be seen that the upper packing bed 38 is of the structured packing variety. The regions of the exchange column 10 beneath the upper packing bed 38 are shown for the purpose of illustration and include a liquid collector 40 disposed beneath a support grid 41 in support of the upper structured packing 38. A liquid distributor 42, adapted for redistributing liquid 13, is likewise disposed there-beneath. A second type of distributor 42A is shown below the cut-line 43 and disposed above bed 14. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. Valve trays are herein shown. Such trays comprise plates which are punched or slotted in construction. The vapor and the liquid engage at or along the tray and, in some assemblies, are permitted to flow through the same openings in a counter-current flow arrangement. Optimally, the vapor and liquid flows reach a level of stability. With the utilization of downcomers, to be described in more detail below, this stability may be achieved with a relatively low flow rate permitting the ascending vapor to mix with the descending liquid. In some embodiments no downcomers are used and the vapor and the liquid use the same openings, alternating as the respective pressures change. But such is not the case herein.

In the present embodiment, cross-flow valve trays 48 and 49 and downcomers 53 and 69 are illustrated. Tray 48 is constructed with a plurality of valves. Tray 49 also illustrates a raised inlet section 51 beneath downcomer 53 which, in accordance with the present invention, is substantially planar, formed with a plurality of apertures and includes a series of momentum deflector shields as will be described below. The raised inlet area is described in more detail in U.S. Pat. No. 4,956,127. Corrosion is another consideration in designing packed towers and for the selection of the material, design, and the fabrication of the tower internals. The anatomy of process columns as shown in FIG. 1 is likewise described in more detail in an article by Gilbert Chen, entitled "Packed Column Internals" appearing in the Mar. 5, 1984 edition of *Chemical Engineering*, incorporated herein by reference.

Figure 2:
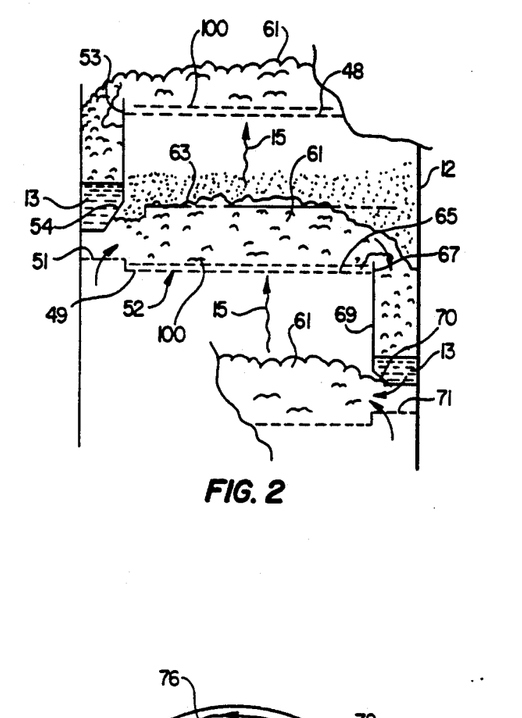
FIG. 2 is a diagrammatic, side-elevational, cross-sectional view of the improved downcomer-tray assembly of the present invention secured within a process tower and illustrating the flow of liquid and vapor thereacross.

Referring now to FIG. 2, there is shown a side-elevational, cross-sectional, diagrammatic view of several aspects of the present invention. An upper tray 48 comprises a first perforated panel. The lower tray 49 is also of generally planar construction across its central active area 52, having a plurality of valves 100 mounted therein, as diagrammatically shown. Liquid 13 travels down a downcomer 53 having a tapered or mitered bottom section 54, from tray 48 disposed thereabove. The tapered section 54 of the downcomer provides a clearance angle for vapor flow from the active inlet area, which clearance angle affords a horizontal flow vector to the vapor vented through raised panel 51. The liquid 13 engages vapor 15 discharged from the raised active panel area 51 beneath the downcomer 53. Momentum deflector shields 101 are diagrammatically shown upon the area 51, as will be discussed below.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into a mitered region 70 where the liquid accumulates and disperses upon active inlet region 71 therebeneath. Again active inlet region 71 is shown herein diagrammatically for purposes of illustration only. As stated herein, the area of holes and perforations for a single cross-flow plate establish the active length of the plate and the zone in which the froth 61 is established. It should be noted that the present invention would also be applicable to multiple downcomer configurations, wherein the downcomers and raised, active inlet areas may be positioned in intermediate areas of the trays as also described below. By increasing the total active area by active inlet areas 51 and 71, greater capacity and efficiency is achieved. It is also the manner of flow of the liquid 13 across the tray 49 which, in the present embodiment, is critical to tray efficiency. A flow diagram of a conventional tray will be discussed below for purposes of illustrating the efficiency afforded by the present invention.

Figure 3:
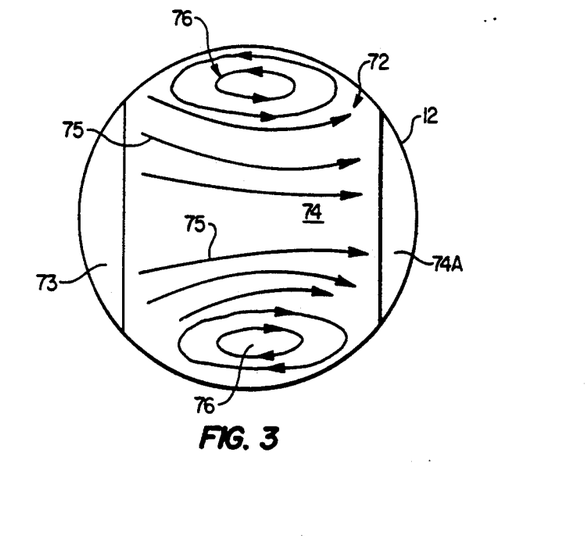
FIG. 3 is a top-plan, diagrammatic view of a prior art tray illustrating problems with the liquid flow thereacross.

Referring now to FIG. 3, there is shown a flow diagram across a conventional tray. The prior art tray 72 is illustrated herein as a round unit having a first conventional downcomer for feeding liquid upon a solid, underlying panel 73 and then to the tray 74. A second downcomer 74A carries liquid away from the tray. A plurality of arrows 75 illustrate the non-uniform flow of liquid 13 typically observed across a conventional prior art tray which does not address the circulation issue Circular flow is shown to be formed on both sides of the plate lateral to the direction of primary flow. The formation of these retrograde flow areas, or recirculation cells 76, decreases the efficiency of the tray. Recirculation cells 76 are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of plate efficiency, the reduction thereof is provided concurrently with the other advantages hereof. Reference is again made to the plate efficiency discussion set forth in above referenced, copending patent application Ser. No. 07/304,942.

Figure 4:
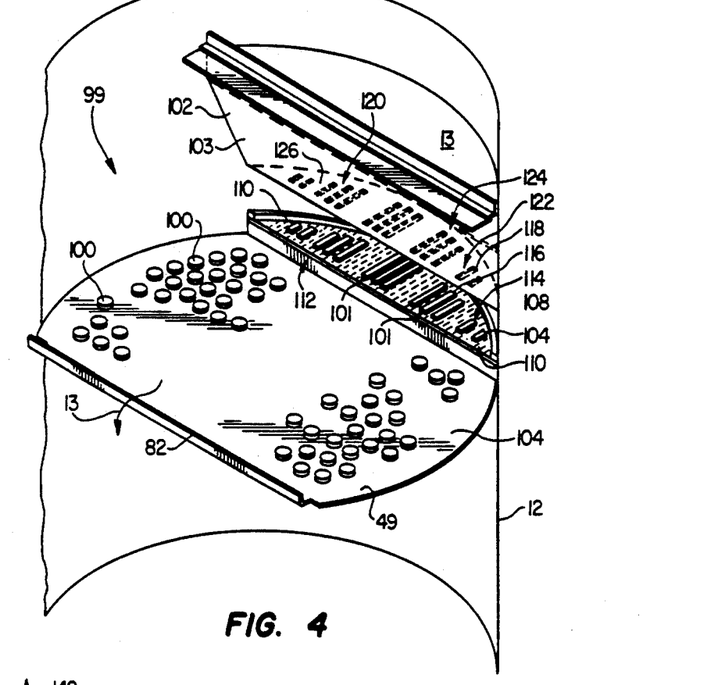
FIG. 4 is a perspective view of the downcomer-tray assembly of the present invention, with portions thereof cut away for purposes of clarity.

Referring now to FIG. 4, there is shown an enlarged, fragmentary perspective view of a downcomer-tray assembly 99 constructed in accordance with the principles of the present invention. The tray 49, as shown herein, is constructed for placement in the tower 12 whereby a feeding downcomer 102 having an inclined face 103, is disposed over a raised inlet region 104 for providing liquid 13 to tray 49. A weir 82 is disposed on the opposite side of tray 49 whereby a second downcomer is disposed for carrying froth 61 and liquid 13 away from the tray 49. Liquid 13 spills down upon active inlet panel 104 and over upstanding edge 106 onto the tray 49.

Still referring to FIG. 4, there is shown the top surface 108 of raised inlet region 104, constructed with a plurality of apertures 110 diagrammatically shown herein and more fully set forth and described in copending patent application Ser. No. 320,420. The apertures 110 are, in certain areas, partially eliminated or blocked off by barrier strips 101. Barrier strips 101 comprise strips of metal (blanking strips) tack welded to the surface 108 in defined patterns. The strips 101 comprise momentum barriers and are seen to be provided in groups 112. Particular momentum barrier group 114 is disposed adjacent the edge of the column 12 with an intermediate group 116 disposed inwardly thereof. The strips 101 of group 116 are seen to be substantially longer than those of group 114 as will be discussed in more detail below.

Referring still to FIG. 4, the groups 112 are sized and positioned in a mirror image of the orifices 118 of feeding downcomer 102. The orifices 118 are likewise provided in groups 120 wherein end group 122 is disposed immediately above momentum barrier group 114. Likewise, intermediate group 124 is disposed directly above momentum barrier group 116. The orifices 118 and groups 122 and 124 form the bottom 126 of downcomer 102 in a slotted configuration that is presented to more precisely distribute the flow onto the surface of the tray 49. This feature provides a more uniform flow without the retrograde problem discussed above. By utilizing select groupings of apertures such as elongated slots 118 which are selectively spaced into groups 120, the discharge from downcomer 102 can be selectively designed by those skilled in the art to enhance uniform flow across the tray, reduce back mixing therein, and to afford a number of other advantages as discussed below. The reduction of back mixing will increase the concentration-difference driving force for mass transfer between the counter flowing streams of gas and liquid. In this particular tray 49, a series of small valves 100 are provided for the entry of gas 15 into the liquid flow as discussed below.

Figure 5:
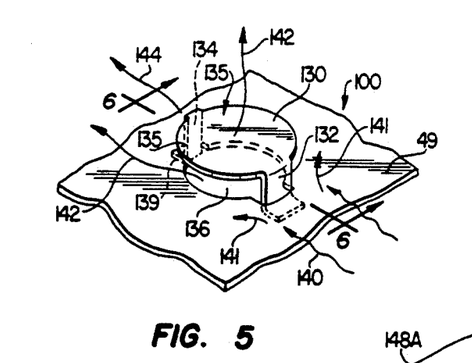
FIG. 5 is an enlarged, perspective view of one valve of the tray surface disposed adjacent the downcomer of the present invention.

Referring now to FIG. 5, there is shown a single float valve 100 of the array shown in FIG. 4. The valve 100 is comprised of a circular disc 130 having securement feet 132 and 134 depending therefrom. The valve 100 is mounted within the surface of tray 49 and disposed above an aperture 136 formed therein. The aperture 136 includes a pair of slotted regions 138 and 139 adapted for receiving the legs 132 and 134, respectively. The advantages of this type of valve design are most clearly set forth and shown in co-pending U.S. patent application Ser. No. 07/577,360 filed on even date herewith.

Figure 6:
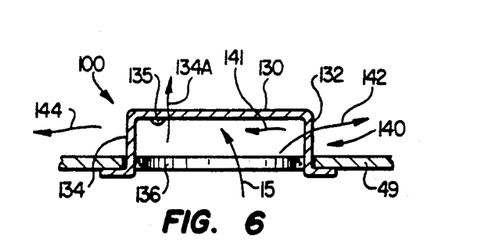
FIG. 6 is an enlarged, side-elevational, cross-sectional view of the valve structure of FIG. 5.

Referring now to FIG. 6, there is shown the valve 130 of FIG. 5 in a side elevational, cross sectional view thereof. Frontal leg member 132 is seen to provide a moveable barrier for engaging a liquid flow 140 coming from the raised inlet area 104 (not shown herein). Vapor 15 ascending through the tray deck 49 is exhausted as represented by arrow 142. The escaping vapor 142 interacts immediately with the liquid flow 140, which liquid flow has been initially diverted around the edges of the circular aperture 136. The liquid flow then continues downstream of leg 134 as represented by arrow 144.

Figure 7:
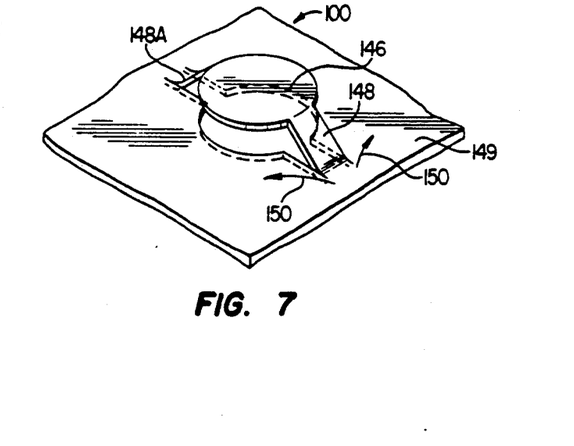
FIG. 7 is a perspective view of an alternative embodiment of the valve structure of FIG. 5.

Referring now to FIG. 7 there is shown an alternative embodiment of the valve 100. A stationary, upstanding hooded cover 146 comprises an upstream leg 148 that is both angulated and permanently formed in an active tray section 149 to facilitate the diversion of liquid flow therearound in the direction of arrows 150. This figure is provided for purposes of illustrating the various forms of tray valves that may be incorporated in accordance with the principles of the present invention. It should be understood, however, that a myriad of tray surfaces other than valves may be utilized with the present invention. For example, an aperture sieve type trays such as tray and/or Screen Trays of the type comprising a plurality of spaced trapezoidal wires could be used.

Figures 8, 8A, 9:
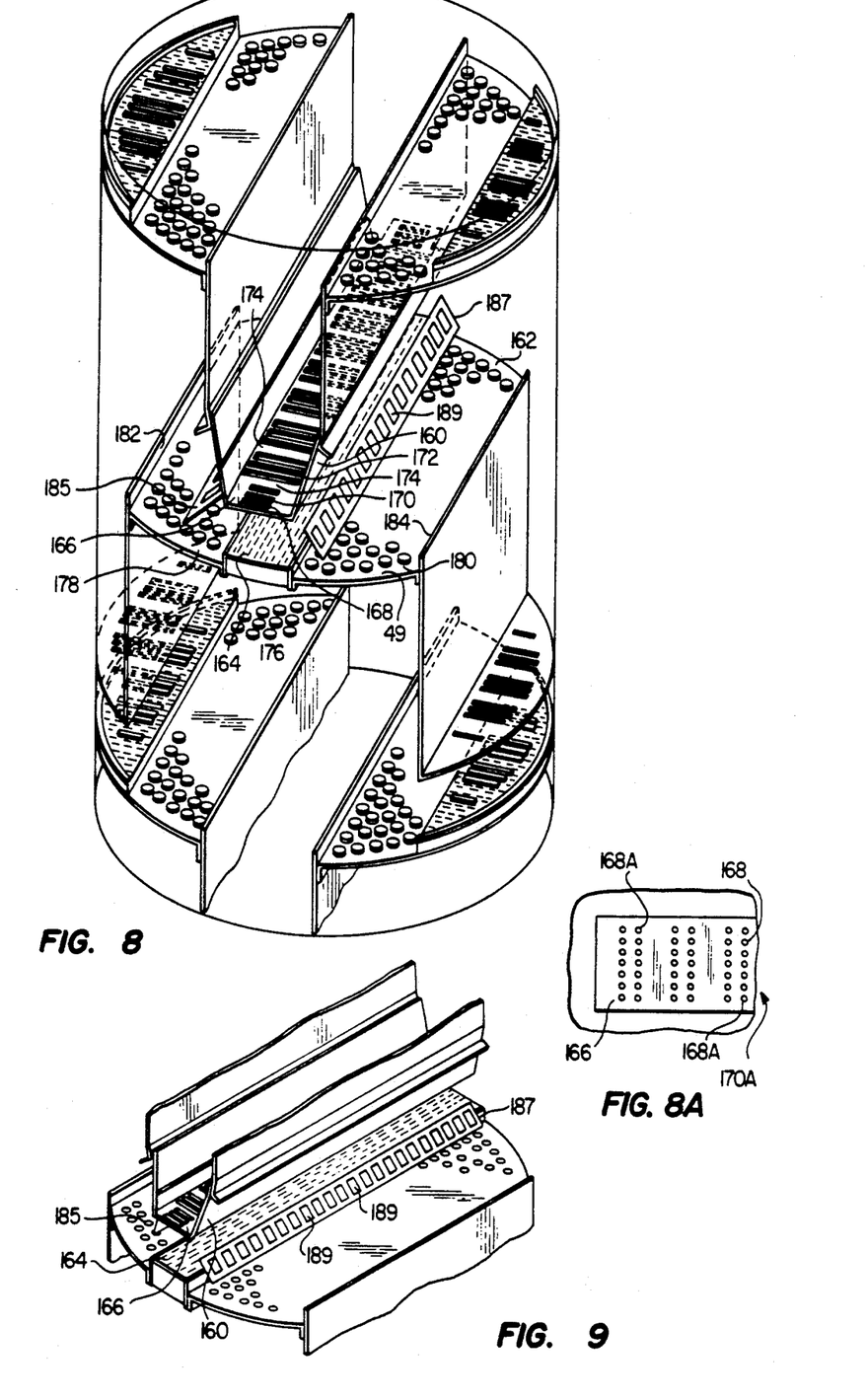
FIG. 8 is a perspective view of an alternative embodiment of the downcomer tray assembly of the present invention illustrating a multiple downcomer configuration.
FIG. 8A is an enlarged, top plan, fragmentary view of a section of the downcomer of FIG. 8 showing an alternative discharge orifice configuration.
FIG. 9 is the fragmentary perspective view of a portion of the downcomer tray assembly of FIG. 8 illustrating one of the splash deflectors therein.

Referring now to FIG. 8, there is shown a perspective view of an alternative embodiment of the downcomer tray of the present invention. Central downcomer 160 is shown disposed above a tray 162 having a raised active inlet area 164 disposed in the mid section thereof. The downcomer 160 is likewise constructed with a bottom 166 disposed immediately above the tray 164. A plurality of slots 168 are formed in the bottom 166, said slots being disposed in select groupings across the bottom 166 for controlling the size and shape of the streams of liquid discharged from the downcomer 160 onto the raised active inlet area 164. In this manner, both the quantity of liquid and the configuration of the discharge stream are controlled. Slot grouping 170 is thus shown to be comprised of smaller slots 168 relative to the inner grouping 172. The slots 168 may also be comprised of smaller holes of a variety of shapes, such as those shown in FIG. 8A. The smaller orifices 168A are grouped into larger patterns that comprise the slot 168 of grouping 170A. FIG. 8A is an enlarged top plan view of such an alternative embodiment of the slot grouping 170 in bottom 166 of FIG. 8.

Still referring to FIG. 8, it may be seen that a series of solid panel sections 174 are disposed between the individual groups of slots 168. This segregation of the slotted portions above the raised active inlet area 164 permits a wide latitude in design for accommodating variations in flow. In this particular embodiment, the raised active inlet area does not require separate momentum barriers. Discharge 176 is thus carried downwardly in discrete streams from slots 168 into inlet area 164 and then outwardly onto the active tray areas 178 and 180 where said flow interacts with vapor rising through the tray 49 and then engages downcomers 182 and 184, respectively. This type of tray 49 is referred as a multiple downcomer (MD) tray and may likewise utilize the principles of the present invention in an efficient and cost effective manner.

Still referring to FIG. 8, there is shown splash deflectors 185 and 187 disposed on opposite sides of the downcomer 160, intermediate of the raised active inlet area 164. The splash deflectors 185 and 187 equalize liquid flow and prevent the splash of liquid discharge beyond the area of said deflectors. The deflectors 185 and 187 substantially contain the discharged liquid for maximum contact with the vapor ascending through the active tray surface area. In certain flow configurations, the absence of the splash deflectors could result in the splash of liquid from the raised active inlet area over a large section of the active tray area, which would reduce efficiency.

Referring now to FIG. 9, there is shown an enlarged perspective view of the splash deflector 187 of FIG. 8 adjacent the raised active inlet area 164 thereof. The splash deflector 187 is constructed of a plurality of slotted portions 189 in this particular embodiment. The slotted portions are provided to facilitate the passage of vapor flow therethrough, and other perforate structures may be utilized. For example, the splash deflector 187 may be constructed of expanded metal having a plurality of small apertures defined between the twisted lands of the expanded metal. Moreover, directional flow slots having louvers formed thereon could be incorporated, and in certain instances, the splash deflector 187 could be solid. The deflector 187 is also shown to be in a sloped configuration although its orientation could vary from vertical to a myriad of other angles.

In operation, the method and apparatus of the present invention provide improved downcomer tray efficiency and flow regulation. The liquid is selectively discharged onto the inlet area in separate streams of predefined size and shape, depending on the orifice configuration. The orifice comprising slot 168 (FIG. 8) is sized and shaped for said selective stream configuration. Smaller streams are provided, for example, in orifice grouping 170 relative to grouping 172. The shape of the streams may be altered by altering the shape of the orifice, and the use of groups of smaller apertures 168A (FIG. 8A) permits a wide latitude of design flexibility in this area. This functional aspect of the liquid flow regulation is particularly manifest when the grouped orifice downcomer is used with a raised active inlet area such an panel 164. With the preferential vapor flow of such a panel, aeration of the liquid occurs directly beneath the downcomer. The grouping of the downcomer orifices then promotes uniform aeration of the discharge liquid by permitting vapor to rise and spread outwardly therethrough in those select areas between the shaped orifices. The rising vapor augments the aeration of liquid above the panel areas that are directly below the downcomer discharge orifices. The improved uniformity of aerated liquid tends to "cushion" the momentum of the liquid falling thereon. The "cushion" further deters leakage of the liquid therethrough, particularly at the points of locally high momentum where barrier strips 101 (FIG. 4) may be used.

Finally, the use of splash deflector 185, 187 further enhances the uniformity of liquid flow. The deflector 185, 187 may function as a liquid flow interrupter which evens out undesirable perturbations in the flow. An increased liquid head can be established behind the deflector 185 adjacent the downcomer, whereby liquid flow beneath and through the deflector is more uniform. The deflector 185 may likewise be modified for select flow control by reducing the size of the deflector body or the apertures 189 therethrough in certain areas. These are structural and functional aspects of the deflector 185, 187 in addition to its ability to simply intercept and deflect liquid splashing outwardly from the inlet panel.

It is thus believed that the operation and construction of the present invention will be apparent from the foregoing description. For the method and apparatus shown or described has been characterized as being preferred it will be obvious that various changes and modifications may be made therein without departing from the spirit and scope of the invention as defined in the following claims.

What is claimed is:

1. An improved method of mixing vapor with liquid discharged from a downcomer of a process column onto an underlying cross flow tray, with said column having a plurality of trays and downcomers spaced vertically one from the other therein and maintaining liquid vapor flow stability therethrough wherein the improvement comprises:

forming said downcomer with a discharge region having a select number of discharge orifices therein for a select number of liquid streams discharging therefrom;

sizing said discharge orifices across said discharge region for discharge of select liquid quantities in select streams;

forming said cross flow tray with an active inlet area having vapor flow openings therein for select vectoring of vapor therefrom and with an active area therein for mixing of said vapor and liquid thereon;

disposing said active inlet area beneath said discharge region of said downcomer and in flow communication with said active area of said cross flow tray;

forming said active inlet area to vector vapor from said vapor openings to engage liquid and cause said liquid to selectively flow across said active area of said cross flow tray; and spacing said discharge orifices above said active inlet area for discharging liquid from said downcomer in select quantities and streams across said active inlet area and in a manner which promotes the select flow of said liquid across said active area of said cross flow tray and reduces backmixing occurring on said active area of said cross flow tray; and further including the step of providing a plurality of blanking strips for positioning beneath said orifices of said downcomer and the step of securing said blanking strips upon said inlet area beneath said discharge orifices for breaking the momentum of the liquid flow therefrom to inhibit the passage of said liquid through said active inlet area.

2. The method as set forth in claim 1 wherein the step of providing said discharge orifices includes the step of forming smaller discharge orifices near the opposite ends of said downcomer for discharging less liquid therefrom.

3. The method as set forth in claim 1 wherein said step of forming said downcomer includes the steps of positioning said downcomer in an intermediate area of said tray in a multiple downcomer configuration and discharging liquid outwardly from said downcomer in opposite directions relative thereto.

4. The method as set forth in claim 1 and including the step of forming said blanking strips in substantially the same size and shape of said downcomer discharge orifices.

5. The method as set forth in claim 1 and further including the step of providing said discharge orifices in groups of smaller orifices for discharging select configurations of liquid therefrom.

6. The method as set forth in claim 5 wherein said step of providing said groups of discharge orifices includes the step of forming said orifices in a generally rectangular shape.

7. The method set forth in claim 6, wherein each of said discharge orifices is rectangular in shape and said groups of discharge orifices are formed in round patterns.

8. An improved downcomer tray assembly for a process column of the type wherein liquid flows downwardly through a first downcomer onto a first tray and across the active area thereof through which vapor flows upwardly therethrough for interaction and mass transfer therewith before passing therefrom by a second downcomer, said improvement comprising an active inlet area disposed beneath said first downcomer for vectoring liquid across said active area of said first tray by directing said vapor against said liquid and means for discharging liquid from said downcomer in select quantities and streams relative to said active inlet area disposed beneath said downcomer; and a plurality of barrier strips disposed between said downcomer discharge means and said active inlet area for protecting said active inlet area from the momentum of said liquid discharged from said downcomer.

9. The apparatus as set forth in claim 8 wherein said discharge means comprises a plurality of apertures of select size and shape disposed along a discharge panel of said downcomer and said barrier strips comprise blanks of metal of substantially equal size and shape to said apertures of said downcomer formed in said discharge panel, said barrier strips being disposed immediately beneath said apertures for receiving the discharge of liquid thereupon.

* * * * *

UNITED STATES PATENT AND TRADEMARK OFFICE
CERTIFICATE OF CORRECTION

PATENT NO. : 5,277,848
DATED      : January 11, 1994
INVENTOR(S): Michael J. Binkley and John J. Thorngren It is certified that error appears in the above-indentified patent and that said Letters Patent is hereby corrected as shown below:

In the Abstract, Line 7: Delete —cages—; insert "cases"

Column 3, line 21: Delete —an—; insert "as"

Column 4, line 17: Delete —lose—; insert "loss"

Column 6, line 33: Delete —now,—; insert "now"

Signed and Sealed this

Sixteenth Day of August, 1994

*Attest:*

BRUCE LEHMAN

*Attesting Officer*        Commissioner of Patents and Trademarks